(12) United States Patent
Elbrecht et al.

(10) Patent No.: US 10,587,292 B2
(45) Date of Patent: Mar. 10, 2020

(54) MULTIPLEXER WITH SWITCHED FILTER BRANCH INCLUDING HIGH-Q COMPONENTS

(71) Applicant: Avago Technologies International Sales Pte. Limited, Singapore (SG)

(72) Inventors: Lueder Elbrecht, Munich (DE); Hongya Xu, Munich (DE)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 15/964,175

(22) Filed: Apr. 27, 2018

(65) Prior Publication Data
US 2019/0334563 A1    Oct. 31, 2019

(51) Int. Cl.
*H04B 1/48* (2006.01)
*H04B 1/00* (2006.01)

(52) U.S. Cl.
CPC ............. *H04B 1/0057* (2013.01); *H04B 1/48* (2013.01); *H04B 2001/485* (2013.01)

(58) Field of Classification Search
CPC .. H04B 1/0057; H04B 1/48; H04B 2001/485; H04J 3/247; H04N 21/23614; H04N 21/2365; H04N 21/23655; H04N 21/2368; H04N 21/2381; H04W 56/0005
See application file for complete search history.

(56) References Cited

U.S. PATENT DOCUMENTS

2017/0070405 A1* 3/2017 Hashemi ............ H04L 25/03949

* cited by examiner

*Primary Examiner* — Dady Chery
(74) *Attorney, Agent, or Firm* — Sheridan Ross P.C.

(57) ABSTRACT

A multiplexer includes a common port, multiple filter branches and at least one switch included in a switched filter branch of the multiple filter branches. The filter branches are connected to the common port, and each filter branch corresponds to at least one predetermined frequency band and filters a radio frequency (RF) signal according to the corresponding at least one predetermined frequency band. In a first switch state of the at least one switch, the switched filter branch includes a high-Q filter having multiple high-Q components for improving roll-off of the filtered RF signal, and in a second switch state of the at least one switch, the switched filter branch includes a low-Q filter having multiple low-Q components that support a very high bandwidth for filtering the RF signal.

20 Claims, 8 Drawing Sheets

MULTIPLEXER WITH SWITCHED FILTER BRANCH INCLUDING HIGH-Q COMPONENTS

BACKGROUND

Mobile communication devices, such as cellular telephones, portable computers, personal digital assistants (PDAs), gaming devices, and the like, are configured to communicate over wireless networks. Such portable communication devices may enable communication over multiple networks, and therefore include transmitters, receivers and corresponding filters. Often, respective filters are arranged in the form of multiplexers, connecting multiple transmit and receive bands to a common antenna, enabling concurrent use of multiple radio frequency (RF) signals over various wireless networks.

The multiplexer interfaces between the antenna, or other common node, and each of the networks to enable transmitting signals on different transmit (uplink) frequencies and receiving signals on different receive (downlink) frequencies. The filters in filter branches associated with the multiplexer have to pass-through various transmitted and received signals in a defined frequency band (so-called "passband"), and at the same time block signals outside the passband (in the so-called "stopband"), especially in the in the passbands of the other filter branches used in the same multiplexer. In this manner, the likelihood of the signals of the wireless networks, passing through the respective filters, interfering with each other is greatly reduced. With the ever increasing need for mobile data, new frequency bands are being defined and enabled for the mobile communication devices. Ideally, these new frequency bands are provided in ways that the respective RF signals can be used concurrently with the presently supported wireless links, for example, by accommodating the RF signals in the new frequency bands to the same antenna(s) of mobile communication devices using multiplexers, which prevent detrimental cross-talk between the RF signals of the individual frequency bands.

From filter curve characteristics, one can differentiate between band pass filters, which provide passbands for relatively narrow frequency bands, and notch filters, which provide stopbands in relatively narrow frequency bands (passing all signals with frequencies outside these stopbands). Band pass filters and notch filters may be used in a complementary fashion, such that notch filter(s) associated with one wireless network have stopband(s) that correspond to (e.g., match) passband(s) of band pass filters(s) associated with another wireless network.

Many of the recently defined new frequency bands are at frequencies above 3 GHz, because the spectrum below 3 GHz currently is almost fully allocated. FIG. 1 is a schematic diagram showing examples of new frequency bands in the ultra-high band domain (3 GHz 10 GHz). In particular, FIG. 1 shows frequency band n77 (3.3 GHz-4.2 GHz), frequency band n78 (3.3 GHz-3.8 GHz), and frequency band n79 (4.4 GHz-5.0 GHz), together with the existing 5 GHz WiFi band (5.1 GHz-6.0 GHz). However, as shown in FIG. 1, the frequency separation of respective new frequency bands is typically low in order to maximize available bandwidth for the mobile data.

Therefore, to be effective, antenna multiplexers need to provide filtering with high bandwidths, as well as steep roll-offs, which requires low insertion loss in the respective passbands and high rejection at adjacent frequency bands. Achieving both high bandwidths and steep roll-offs is difficult with conventional filtering technologies and architectures for antenna multiplexers. Generally, technologies that provide steep roll-off, are based on resonances with a high quality factor (i.e., "high-Q"), such as acoustic wave resonances, e.g., in Bulk Acoustic Wave (BAW) or Surface Acoustic Wave (SAW) resonator devices using piezoelectric materials. "High-Q" means a quality factor (i.e., "Q-factor") of at least 500.

However, such acoustic wave resonators typically do not support very high bandwidths required for frequency bands defined for ultra-high band domain, as the achievable bandwidth is limited by the intrinsic bandwidth of the acoustic resonance, which is defined by the material properties of the respective acoustic resonator. In contrast, other technologies that can provide very high bandwidths, e.g., filters composed of resonant circuits created from inductors (L) and capacitors (C), so called "LC circuits" or "LC filters." However, such LC filters and/or filter components only have a low Q-factor (less than 100), and therefore may not provide sufficient roll-off steepness to protect adjacent frequency bands in the ultra-high band domain, depending on the frequency bands. Therefore, a different solution for multiplexers is needed that supports high bandwidth and steep roll-off, as well as low frequency separation, at ultra-high frequencies (3 GHz and higher).

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
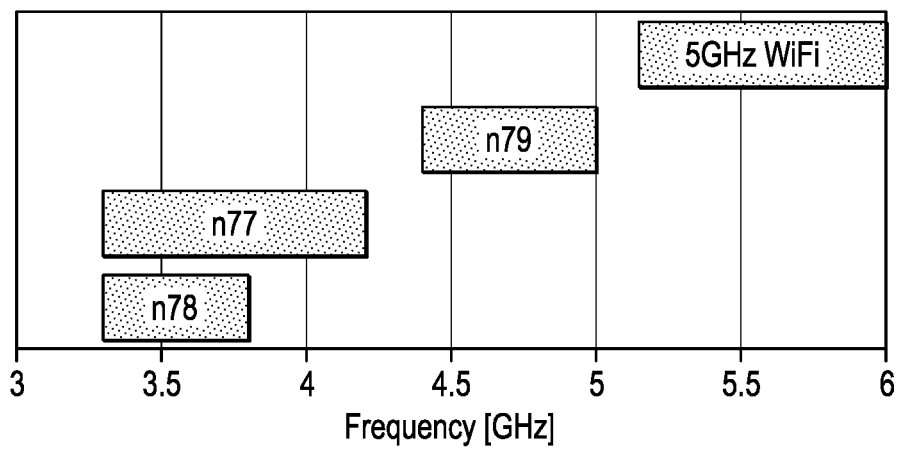
FIG. 1 is a schematic diagram showing examples of new frequency bands in the ultra-high band domain.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

It is understood that the drawings and the various elements depicted therein are not drawn to scale. Further, relative terms, such as "above," "below," "top," "bottom," "upper" and "lower" are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be below that element.

Generally, multiplexers are provided that enable concurrent use of multiple ultra-high frequency bands with minimum insertion loss, as well as steep roll-offs, e.g., in mobile communication devices. According to a representative embodiment, a multiplexer includes a common port, multiple filter branches and at least one switch included in a switched filter branch of the multiple filter branches. The multiple filter branches are connected to the common port, and each filter branch corresponds to at least one predetermined frequency band and filters a radio frequency (RF) signal according to the corresponding at least one predetermined frequency band. In a first switch state of the at least one switch, the switched filter branch includes a high-Q filter having high-Q acoustic resonators for improving roll-off of the filtered RF signal, and in a second switch state of the at least one switch, the switched filter branch includes a low-Q filter having low-Q components (and no high-Q filter stage) that support a very high bandwidth for filtering the RF signal.

Figure 2:
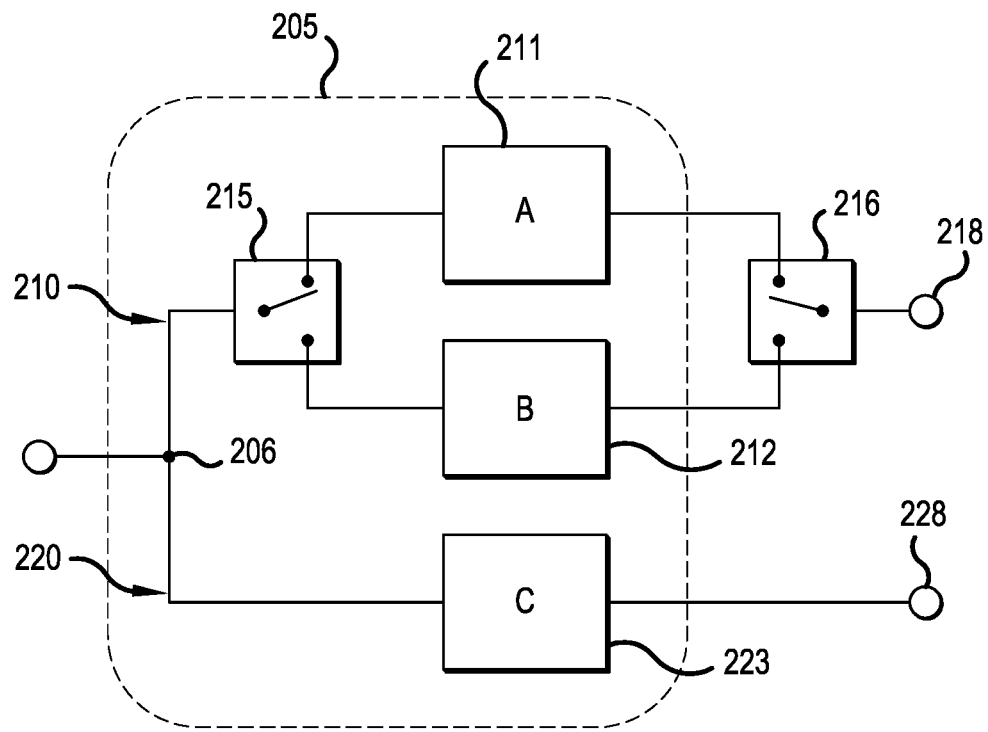
FIG. 2 is a simplified block diagram of a multiplexer including multiple filter branches, at least one of which having a selectable high-Q filter, according to a representative embodiment.

FIG. 2 is a simplified block diagram of a multiplexer including multiple filter branches, at least one of which having a selectable high-Q filter, according to a representative embodiment.

Referring to FIG. 2, a multiplexer 205 includes a common node 206 and multiple filter branches connected to the common node 206, indicated by illustrative first filter branch 210 and second filter branch 220. Each of the first and second filter branches 210 and 220 corresponds to at least one predetermined frequency band, and filters RF signals according to the frequency ranges of the corresponding frequency band(s). In various embodiments, the frequency bands are in the ultra-high band domain (3 GHz 10 GHz). The multiplexer 205 may be configured to receive RF signals at the common node 206 and/or to send RF signals from the common node 206 for various implementations of the multiplexer 205 and corresponding networks. In various embodiments, the common node 206 may be an antenna node, for example, connected to a common antenna for receiving and transmitting RF signals from a mobile device, as discussed below.

In the depicted embodiment, the first filter branch 210 corresponds to two selectable frequency bands, indicated as first frequency band A and second frequency band B, both of which include frequencies greater than 3 GHz, for purposes of illustration, and may be 3GPP, ITU and/or FCC defined frequency bands. Accordingly, the first filter branch 210 includes filter 211 to provide band pass filtering for the first frequency band A, and filter 212 to provide band pass filtering for the second frequency band B. The second filter branch 220 corresponds to one frequency band, indicated as third frequency band C, also including frequencies greater than 3 GHz, for purposes of illustration. Accordingly, the second filter branch 220 includes filter 223 to provide band pass filtering for the third frequency band C. One or more of the first, second and third frequency bands A, B and C may include frequencies less than 3 GHz, without departing from the scope of the present teachings.

Because the first filter branch 210 corresponds to two selectable frequency bands, the multiplexer 205 further includes a switch 215 in the first filter branch 210. The switch 215 may be a single pole, double throw switch, for example, configured to switch between a first switch state and a second switch state, where the first switch state selects the filter 211 for filtering the first frequency band A, and the second switch state selects the filter 212 for filtering the second frequency band B. For purposes of illustration, it is assumed that the filter 211 is a high-Q filter including multiple high-Q components, such as high-Q acoustic resonators, for improving roll-off of the filtered RF signal in the passband of the first frequency band A. For example, the filter 211 may include high-Q BAW resonators, such as thin film bulk acoustic resonators (FBAR) or solidly mounted resonators (SMRs). Likewise, the filter 211 may include high-Q surface acoustic wave (SAW) resonators. In particular, each of the high-Q components has a Q-factor of at least 500, or in various embodiments, a Q-factor of at least 1000 (or between 500 and 1000). Additionally, a high-Q filter does not support a very high bandwidth (discussed below) for filtering the RF signal. Therefore, with the switch 215 in the first switch state, the first filter branch 210 provides a high-Q filter, in which the roll-off at the edges of the passband is steep, even in the ultra-high band domain.

It is further assumed that the filter 212 in the first filter branch 210 is a low-Q filter that includes primarily low-Q filter components and no high-Q filter stage(s), where a high-Q filter stage includes at least one series high-Q acoustic resonator together with at least one shunt high-Q acoustic resonator. The low-Q filter supports a very high bandwidth for filtering the RF signal, but not steep roll-off at the band edges. A very high bandwidth is a bandwidth greater than about 15 percent, as determined by a ratio of the difference between the maximum and minimum frequencies in the passband to the center frequency of the bandwidth. In various embodiments, the filter 212 includes only low-Q components, where each of the low-Q filter components has a Q-factor less than 100. For example, the filter 212 may include inductors (L) and capacitors (C) forming an LC circuit. In alternative embodiments, the filter 212 may include one or more shunt high-Q components (connected to ground) and no series high-Q components, but remains a low-Q filter overall (i.e., providing the very high bandwidth and marginal roll-off). The one or more shunt high-Q components provide some improvement in roll-off of the low-Q filter, but not to the extent of a high-Q filter. Therefore, with the switch 215 in the second switch state, the first filter branch 210 provides a very high bandwidth filter, even in the ultra-high band domain.

Another switch 216, e.g., operable by the controller, is provided at the opposite end of the first filter branch 210 from the switch 215. In the depicted embodiment, operation of the switch 216 mirrors that of the switch 215, connecting the selected one of the filter 211 and the filter 212 between the common node 206 and input/output node 218. The input/output node 218 may be connected, for example, to a transceiver (not shown), as discussed below. Although shown outside the multiplexer 205, it is understood that in alternative configurations, the switch 216 may be included in the multiplexer 205 without departing from the scope of the present teachings.

The switches 215 and 216 may be operated in response to control signals provided by a controller (not shown), for example, depending on which frequency bands or frequency sub-bands are supposed to be concurrently used at specific times of mobile device operation. The controller may be implemented using one or more of a processor, microprocessor, application specific integrated circuits (ASICs), field-programmable gate arrays (FPGAs), or combinations thereof, using software, firmware, hard-wired logic circuits, or combinations thereof, programmed or configured to perform the switching functions in accordance with the appropriate frequency bands and sub-bands, network availability and/or times. A processor or microprocessor, in particular, may be constructed of any combination of hardware, firmware or software architectures, and may include its own memory (e.g., nonvolatile memory) for storing executable software/firmware executable code that allows it to perform the various functions. The controller may also include a memory, accessible by the processor or microprocessor, for storing information regarding operation of the mobile device, including location and availability of various networks with corresponding frequency bands and/or times. The memory may be implemented by any number, type and combination of random access memory (RAM) and read-only memory (ROM), for example, which are tangible and non-transitory storage media (e.g., as compared to transitory propagating signals).

The second filter branch 220 corresponds to a single frequency band, and therefore does not include a switch or multiple filters or sets of filter components. That is, the second filter branch 220 includes filter 223 for filtering the third frequency band C, as mentioned above. The filter 223 may be a high-Q filter that includes multiple high-Q components for improving roll-off of the filtered RF signal in the passband of the third frequency band C, or a low-Q filter that includes low-Q components (e.g., an LC filter), and no high-Q filter stages for supporting a very high bandwidth of the filtered RF signal in the third frequency band C. In various embodiments, the filter 223 may include only low-Q components, for example. The second filter branch 220 is connected to input/output node 228. The input/output node 228 may be connected, for example, to another transceiver (not shown), as discussed below.

Figure 3:
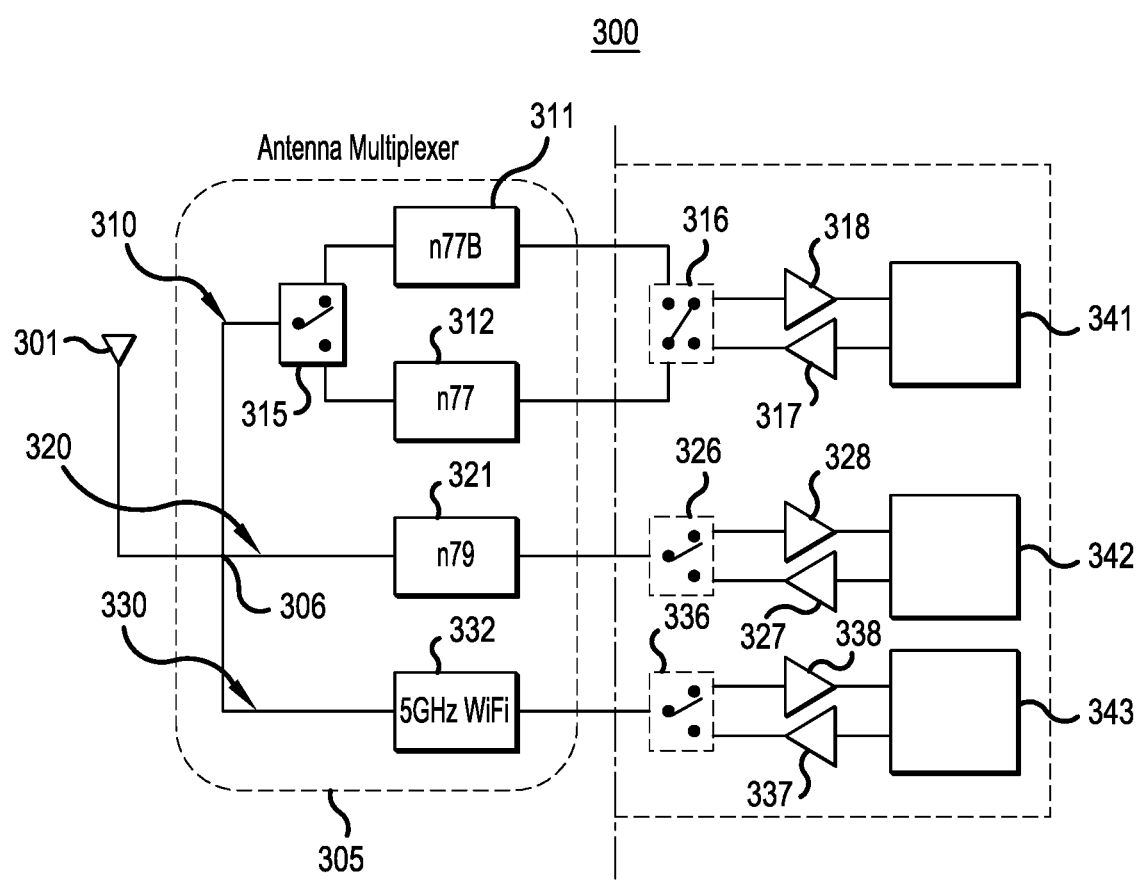
FIG. 3 is a simplified block diagram of a communication device with a multiplexer including multiple filter branches, at least one of which having a selectable high-Q filter, according to a representative embodiment.

FIG. 3 is a simplified block diagram of a communication device with a multiplexer including multiple filter branches, at least one of which having a selectable high-Q filter with high-Q filter components, according to a representative embodiment.

Referring to FIG. 3, a (mobile) communication device 300 includes an antenna 301, a multiplexer 305 with multiple filter branches connected to the antenna 301 via a common antenna node 306, and representative first transceiver 341, second transceiver 342 and third transceiver 343 connectable to the multiple filter branches of the multiplexer 305 via first, second and third switches 316, 326 and 336, respectively. As shown in FIG. 3, the multiple filter branches include illustrative first filter branch 310, second filter branch 320 and third filter branch 330. Each of the first, second and third filter branches 310, 320 and 330 corresponds to at least one predetermined frequency band, and filters (transmitted and/or received) RF signals according to the frequency ranges of the corresponding frequency band (s). In the depicted embodiment, each of the first, second and third filter branches 310, 320 and 330 provides filtering for frequency bands in the ultra-high band domain, i.e., frequencies above 3 GHz, including new frequency bands, although one or more of the first, second and third filter branches 310, 320 and 330 may provide filtering at frequencies below 3 GHz, without departing from the scope of the present teachings.

The multiplexer 305 may be configured to receive RF signals from the antenna 301 at the common antenna node 306 and/or to send RF signals from the common antenna node 306 to the antenna 301. More particularly, the first filter branch 310 is connected between the common antenna node 306 and the first transceiver 341 via the first switch 316; the second filter branch 320 is connected between the common antenna node 306 and the second transceiver 342 via the second switch 326; and the third filter branch 330 is connected between the common antenna node 306 and the third transceiver 343 via the third switch 336. The first switch 316 may be a double pole, double throw switch, for example, since the first filter branch 310 includes two filter options, as discussed below, each of which is selectively connectable to the receive and transmit sides of the first transceiver 341. The second and third switches 326 and 336 may be single pole, double throw switches, for example, since each of the second and third filter branches 320 and 330 provides one filter option selectively connectable to the receive and transmit sides of the second and third transceivers 342 and 343, respectively.

RF signals transmitted by the first transceiver 341 in a transmit mode are amplified by a transmit power amplifier 317 and RF signals received by the first transceiver 341 in a receive mode are amplified by a receive amplifier 318. Likewise, RF signals transmitted by the second transceiver 342 in a transmit mode are amplified by a transmit power amplifier 327 and RF signals received by the second transceiver 342 in a receive mode are amplified by a receive amplifier 328. RF signals transmitted by the third transceiver 343 in a transmit mode are amplified by a transmit power amplifier 337 and RF signals received by the third transceiver 343 in a receive mode are amplified by a receive amplifier 338.

In the depicted embodiment, the first filter branch 310 corresponds to two selectable frequency bands, indicated as frequency band n77 (full band) and the upper portion of the frequency band n77 (defined herein as frequency band n77B) in the depicted example, both of which include frequencies greater than 3 GHz. More particularly, frequency band n77 has a bandwidth of 3.3 GHz-4.2 GHz, and frequency band n77B has a bandwidth of 3.8 GHz-4.2 GHz, although other frequency bands may be incorporated without departing from the scope of the present teachings. Accordingly, the first filter branch 310 includes filter 311 for providing band pass filtering for the frequency band n77B, and filter 312 to provide band pass filtering for the frequency band n77.

Because the first filter branch 310 corresponds to two selectable frequency bands, the multiplexer 305 further includes a switch 315 in the first filter branch 310. The switch 315 may be a single pole, double throw switch, for example, configured to switch between a first switch state and a second switch state, where the first switch state selects the filter 311 for filtering the frequency band n77B and the second switch state selects the filter 312 for filtering the frequency band n77.

Figure 5:
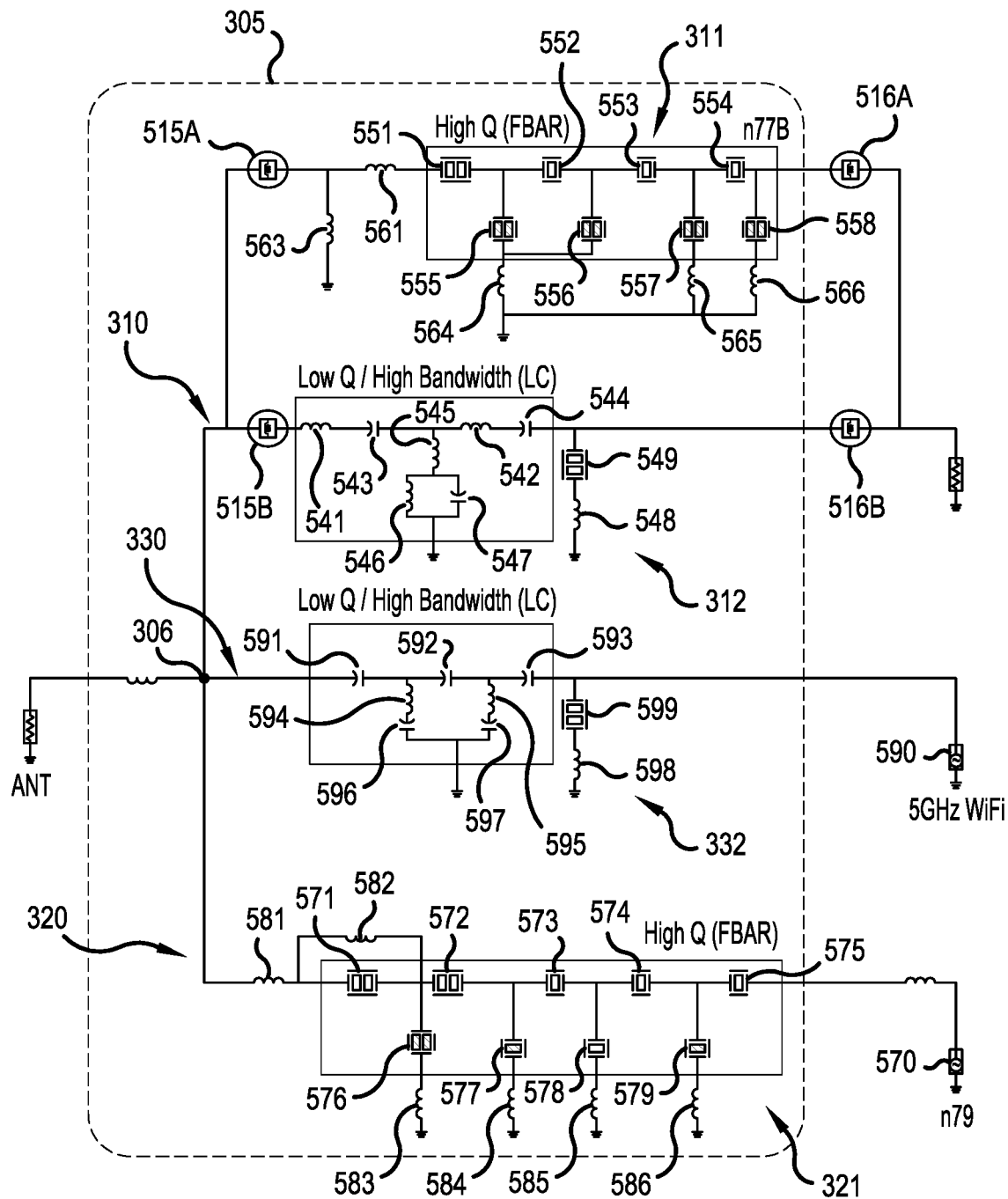
FIG. 5 is a simplified circuit diagram of a multiplexer including multiple filter branches, as shown in FIG. 3, at least one of which having a selectable high-Q filter, according to a representative embodiment.

The frequency band n77B does not require a very high bandwidth, and therefore may be filtered by a high-Q filter including high-Q components, such as high-Q acoustic resonators, for example, to provide steep roll-off of the relatively narrow passband, even in the ultra-high band domain. Thus, when the upper portion of the frequency band n77 is used (e.g., those frequencies are assigned to a specific network operator in a specific region), respective signals can be passed through the multiplexer 305 with very low loss and steep roll-off to the adjacent frequency band n79. As discussed above, the high-Q acoustic resonators may include BAW resonators, such as FBARs and/or SMRs, and/or SAW resonators. In various embodiments (e.g., as shown in FIG. 5), the BAW or SAW resonators may be arranged in a ladder-type filter formation, including series and shunt connected high-Q acoustic resonators. Each of the high-Q acoustic resonators has a Q-factor of at least 500, or in various embodiments, a Q-factor of at least 1000 (or between 500 and 1000). Therefore, with the switch 315 in the first switch state, the filter 311 is able to provide high-Q filtering characteristics, such as steep roll-off, in the first filter branch 310 when selected by operation of the switch 315.

In comparison, the frequency band n77 requires a very high bandwidth (e.g., approximately 21 percent), and therefore the filter 312 is unable to include high-Q acoustic resonators arranged in a high-Q filter stage, for example, due to the limited bandwidths serviceable by such high-Q acoustic resonators. As mentioned above, a high-Q filter stage includes at least one series high-Q acoustic resonator and at least one shunt high-Q acoustic resonator. Rather, the filter 312 includes primarily low-Q components having low-Q characteristics, such as inductors and capacitors arranged in an LC filter circuit configuration (and possibly one or more shunt connected high-Q components to provide some improvement to roll-off, as long as the addition of the high-Q components does not prevent support of the very high bandwidth). Therefore, with the switch 315 in the second switch state, the filter 312 is able to provide the very high bandwidth in the first filter branch 310 when selected by operation of the switch 315.

Also in the depicted embodiment, the illustrative second filter branch 320 corresponds to frequency band n79, which has a bandwidth of 4.4 GHz-5.0 GHz, although another frequency band may be incorporated without departing from the scope of the present teachings. Accordingly, the second filter branch 320 includes filter 321 to provide band pass filtering for the frequency band n79. The frequency band n79 does not require a very high bandwidth, and therefore may include high-Q acoustic resonators arranged in at least one high-Q filter stage, for example, to provide steep roll-off of the relatively narrow passband. As discussed above, the high-Q acoustic resonators may include BAW resonators, such as FBARs and/or SMRs, and/or SAW resonators. In various embodiments (e.g., as shown in FIG. 5), the BAW resonators may be arranged in a ladder-type filter formation, including series and shunt connected acoustic resonators. Therefore, the filter 321 is able to provide high-Q filtering characteristics, such as steep roll-off, in the second filter branch 320.

The illustrative third filter branch 330 corresponds to the frequency band supporting 5 GHz WiFi signals (according to the definitions in IEEE 802.11a/h/j/n/ac/ax), which has a combined bandwidth of about 5.1 GHz-6.0 GHz, although another frequency band may be incorporated without departing from the scope of the present teachings. Accordingly, the third filter branch 330 includes filter 332 for providing band pass filtering for the frequency band for 5 GHz WiFi. The frequency band for 5 GHz WiFi requires a very high bandwidth (e.g., approximately 15 percent), and therefore the filter 332 is unable to include high-Q acoustic resonators arranged in a high-Q filter stage, for example, due to the limited bandwidths serviceable by such high-Q acoustic resonators. Rather, the filter 332 includes primarily components having low-Q characteristics, such as inductors and capacitors arranged in an LC filter circuit configuration. Therefore, the filter 332 is able to provide the very high bandwidth in the third filter branch 330.

Figure 4:
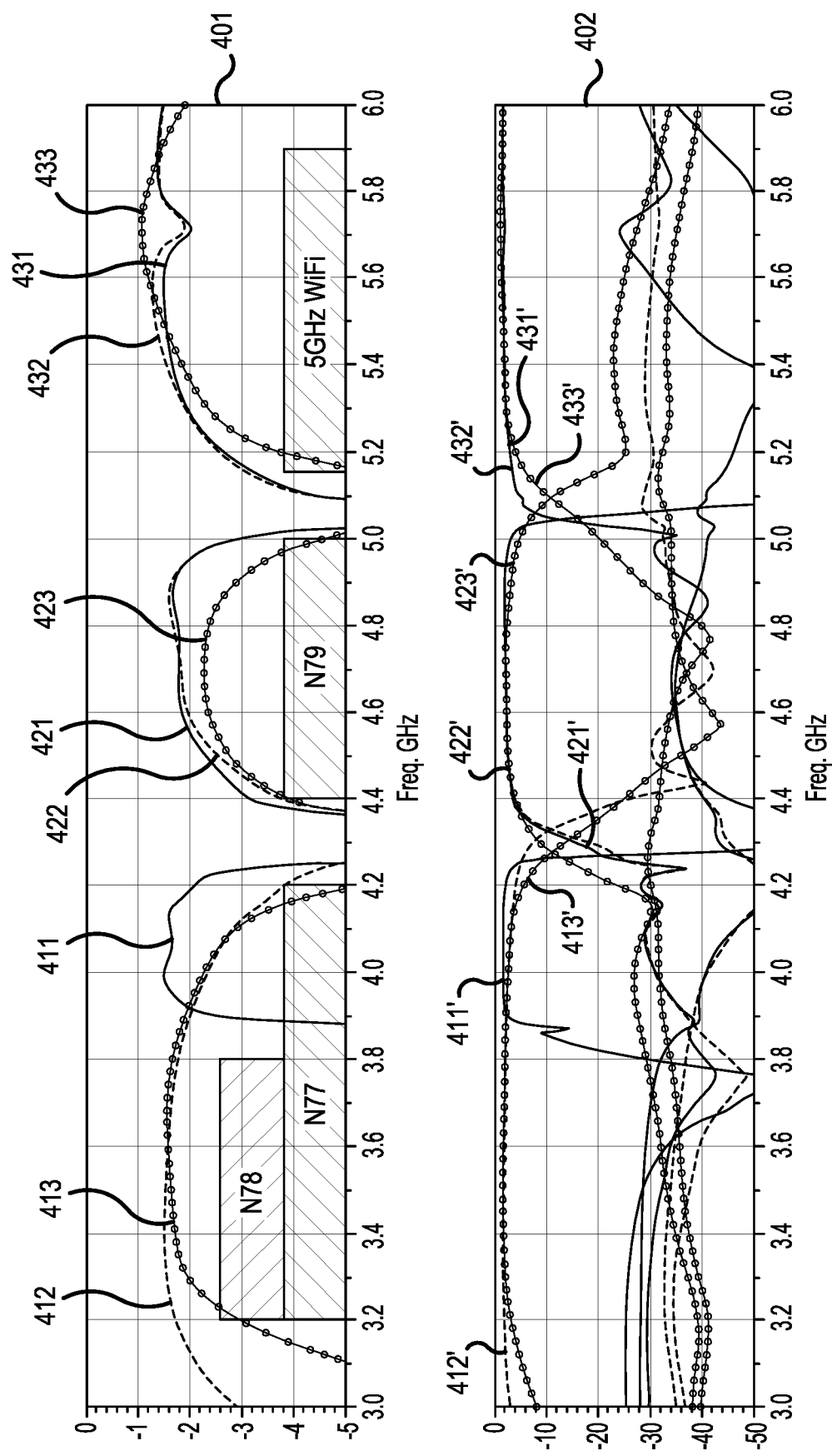
FIG. 4 is a pair of graphs showing insertion loss and signal attenuation, respectively, measured through the filter branches as a function of signal frequency during operation of the multiplexer in the communication device shown in FIG. 3.

FIG. 4 is a pair of graphs showing insertion loss and signal attenuation of the first, second and third filter branches 310, 320 and 330 during operation of the multiplexer 305. Referring to FIG. 4, the top graph 401 shows insertion loss and the bottom graph 402 shows corresponding signal attenuation with regard to the filter branches identified in FIG. 3, using wideband LC (non-high-Q) filter components, high-Q filter components, and conventional LC filter components (for purpose of comparison), respectively.

In the top graph 401, with regard to the first filter branch 310, curve 411 shows the insertion loss measured through the first filter branch 310 for narrow frequency band n77B using the filter 311, which is a high-Q filter defined by high-Q components, such as BAW and/or SAW resonators. Curve 412 shows the insertion loss measured through the first filter branch 310 for frequency band n77 using the filter 312, which is a low-Q filter defined by low-Q components and no high-Q filter stages. For comparison purposes, curve 413 shows the insertion loss for frequency band n77 for a multiplexer using conventional LC filter components for n77, n79 and 5 GHz WiFi, which include no high-Q filter stages. That is, curve 413, as well as related curves 423 and 433 (discussed below), show a pure LC solution using LC circuits for all three of bands n77, n79 and 5 GHz WiFi.

As compared to curves 412 and 413, curve 411 (corresponding to the filter 311) has significantly steeper roll-off at the edges of the passband for the frequency band n77B, as well as lower insertion loss (between 1 dB and 3 dB lower as compared to curve 413, particularly at the upper side of the passband for the frequency band n77B (which corresponds to the upper side of the passband for the frequency band n77, as well). The bandwidth indicated by curve 411 is relatively small, although this enables the use of high-Q filter stages in filtering the upper portion of the frequency band n77B. As compared to curves 411 and 413, curve 412 (corresponding to the filter 312) has significantly higher bandwidth for the frequency band n77, as well as lower insertion loss in some portions than the conventional implementation shown by curve 413, most notably at the edges of the passband for the frequency band n77. This enables the filter 312 to capture the entire bandwidth of the frequency band n77.

With regard to the second filter branch 320, curve 421 and 422 in the top graph 401 of FIG. 4 shows the insertion loss measured through the second filter branch 320 for the relatively narrow frequency band n79 using the filter 321, which includes high-Q components, such as BAW resonators and/or SAW resonators, arranged in one or more high-Q filter stages. Curve 421 shows the case where the switch 315 is connected to the filter 311, whereas curve 422 shows the case where the switch 315 is connected to the filter 312. For comparison purposes, curve 423 shows the insertion loss for frequency band n79 using conventional LC filter components, which include no high-Q components. As compared to curve 423, curve 421 (corresponding to the filter 321) has significantly steeper roll-off at the edges of the passband for the frequency band n79, as well as lower insertion loss (between 1 dB and 2 dB lower as compared to curve 423, particularly in the middle and at the upper side of the passband for the frequency band n79). The bandwidth indicated by curve 421 is relatively small, although this enables the use of high-Q filter components, as discussed above.

With regard to the third filter branch 330, curve 432 in the top graph 401 shows the insertion loss measured through the third filter branch 330 for frequency band 5 GHz WiFi, which includes no high-Q components arranged in a high-Q filter stage. For comparison purposes, curve 433 shows the insertion loss for frequency band 5 GHz WiFi using conventional LC filter components, which include no high-Q components arranged in a high-Q filter stage. As compared to curve 433, curve 432 (corresponding to the filter 332) has a higher bandwidth for the frequency band for 5 GHz WiFi than the conventional implementation shown by curve 433, particularly evident at the lower edge of the passband where the conventional implementation cuts off a portion of the 5 GHz WiFi passband. This enables the filter components 332 to capture the entire bandwidth of the frequency band for 5 GHz WiFi.

In the bottom graph 402, curve 411' shows the attenuation measured through the first filter branch 310, e.g., when the switch 315 is in the first state, for frequency band n77B using the filter 311, curve 421' and curve 422' show the attenuation measured through the second filter branch 320 for frequency band n79, where curve 421' shows the case where the switch 315 is connected to the filter 311, whereas curve 422' shows the case where the switch 315 is connected to the filter 312. Curve 431' shows the attenuation measured through the third filter branch 330. Curve 412' shows the attenuation measured through the first filter branch 310, e.g., when the switch 315 is in the second state, for frequency band n77 using the filter 312, curve 422' shows the attenuation measured through the second filter branch 320, and curve 432' shows the attenuation measured through the third filter branch 330 for the frequency band for 5 GHz WiFi using the filter 332. For comparison purposes, curves 413', 423' and 433' show the attenuation of a multiplexer supporting the frequency bands n77, n79 and 5 GHz WiFi, respectively, using conventional LC filters for all three filter branches.

FIG. 5 is a simplified circuit diagram of a multiplexer including multiple filter branches, as shown in FIG. 3, at least one of which having selectable high-Q filter components, according to a representative embodiment.

Referring to FIG. 5, the multiplexer 305, shown as a circuit diagram, includes the common antenna node 306, to which the first filter branch 310, the second filter branch 320 and the third filter branch 330 are connected. As discussed above with reference to FIGS. 3 and 4, the first filter branch 310 corresponds to two selectable frequency bands, and therefore includes filter components of filter 311 to provide band pass filtering for the frequency band n77B and filter components of filter 312 to provide band pass filtering for the frequency band n77. Also as discussed above, the second filter branch 320 corresponds frequency band n79, and therefore includes components for filter 321 to provide band pass filtering for the frequency band n79, and the third filter branch 330 corresponds the frequency band for 5 GHz WiFi, and therefore includes filter components for filter 332 to provide band pass filtering for the frequency band for 5 GHz WiFi. The first, second and third filter branches 310, 320 and 330 are arranged in a different order in FIG. 5 than in FIG. 3, although this is for the sake of convenience and results in no changes to the operation of the multiplexer 305.

Because the first filter branch 310 corresponds to two selectable frequency bands, the multiplexer 305 further includes switch 315 (shown in FIG. 3) in the first filter branch 310, which is implemented by switch components 515A and 515B in the circuit diagram of FIG. 5. Similarly, first switch 316 (shown in FIG. 3) is implemented by switch components 516A and 516B in the circuit diagram of FIG. 5. The switch component 516A effectively mirrors operation of the multiplexer switch component 515A, switching the filter 311 in and out of the first filter branch 310. Likewise, the switch component 516B effectively mirrors operation of the multiplexer switch component 515B, switching the filter 312 in and out of the first filter branch 310.

In a first switch state, the filter 311 is selected for filtering the frequency band n77B by activating (closing) the switch component 515A (and the switch component 516A) and inactivating (opening) the switch component 515B (and the switch component 516B). In a second switch state, the filter 312 is selected for filtering the frequency band n77 by activating (closing) the switch component 515B (and the switch component 516B) and inactivating (opening) the switch component 515A (and the switch component 516A). The switch components 515A, 515B, 516A and 516B may be solid state switches implemented using CMOS- or Silicon-on-Insulator-Technology, for example.

As discussed above, the frequency band n77B has a relatively narrow bandwidth (e.g., less than 15 percent), and therefore the filter components of filter 311 are able to implemented using high-Q acoustic resonators, such as BAW resonators (e.g., FBARs and/or SMRs), and/or SAW resonators. Accordingly, the filter 311 provides steep roll-off of the relatively narrow passband. In the depicted example, the high-Q acoustic resonators of the filter 311 are FBARs arranged in a ladder-type filter configuration.

More particularly, the filter 311 includes series high-Q acoustic resonators 551, 552, 553, 554 (series resonators) connected in series between the switch components 515A and 516A. Further, shunt high-Q acoustic resonators 555, 556, 567, 558 (shunt resonators) are connected to ground from between series resonators 551 and 552, series resonators 552 and 553, series resonators 553 and 554, and series resonator 554 and the switch component 516A, respectively. In the depicted configuration, the arrangement of series and shunt resonators may be described in terms of high-Q filter stages formed by series resonator 551 and shunt resonator 555, series resonator 552 and shunt resonator 556, series resonator 553 and shunt resonator 557, and series resonator 554 and shunt resonator 558, respectively.

The filter 311 also includes inductors to complete the filter circuit, although inductors are not high-Q components and do not adversely affect the characteristic of the high-Q filter 311. Referring again to the example in FIG. 5, the filter 311 include series inductor 561, and shunt inductors 563, 564, 565 and 566 connected to ground. Of course, various arrangements of high-Q acoustic resonators, inductors and/or other circuit elements may vary, to provide unique benefits for particular situations or to meet application specific design requirements of various implementations of the band pass filter, as would be apparent to one skilled in the art.

As discussed above, the frequency band n77 requires a very high bandwidth, and therefore the filter 312 is unable to include high-Q acoustic resonators arranged as high-Q filter stages. Thus, in the depicted embodiment, the filter 312 comprises an illustrative LC circuit. In particular, series inductors 541, 542 and series capacitors 543, 544 are connected in series between the switch components 515B and 516B. Shunt inductors 545, 546 and shunt capacitor 547 are connected to ground between the series capacitor 543 and the series inductor 542 and ground, where the shunt inductor 546 and the shunt capacitor 547 are in parallel with one another. In addition to the LC circuit, the filter 312 includes a shunt high-Q acoustic resonator 549 and a shunt inductor 548 connected in series with one another to ground between the series capacitor 544 and the switch component 516B. The shunt high-Q acoustic resonator 549 helps with roll-off of the LC circuit in the filter 312, but as it is a single shunt high-Q acoustic resonator, and does not form a high-Q filter stage, it does not limit filter bandwidth or improve roll-off to the extent a high-Q filter does. Of course, various arrangements of LC components and/or other circuit elements may vary, to provide unique benefits for particular situations or to meet application specific design requirements of various implementations of the band pass filter, as would be apparent to one skilled in the art.

In the second filter branch 320, the filter components of the filter 321 are selected for filtering the frequency band n79. As discussed above, the frequency band n79 has a relatively narrow bandwidth (e.g., less than 15 percent), and therefore the filter 321 can be implemented using high-Q components, such as BAW resonators (e.g., FBARs and/or SMRs) and/or SAW resonators. Accordingly, the filter 321 provides steep roll-off of the relatively narrow passband. In the depicted example, the high-Q acoustic resonators of the filter 321 are FBARs arranged in a ladder-type filter configuration.

More particularly, the filter 321 includes series high-Q acoustic resonators 571, 572, 573, 574, 575 connected in series between the common antenna node 306 and a terminal 570. Further, shunt high-Q acoustic resonators 576, 577, 578, 579 are connected to ground from between series high-Q acoustic resonators 571 and 572, series high-Q acoustic resonators 572 and 573, series high-Q acoustic resonators 573 and 574, and series high-Q acoustic resonators 574 and 575, respectively. In the depicted configuration, the arrangement of series and shunt resonators may be described in terms of high-Q filter stages, e.g., formed by series resonator 571 and shunt resonator 576, series resonator 572 and shunt resonator 577, series resonator 573 and shunt resonator 578, and series resonator 574 and shunt resonator 579, respectively.

The filter 321 also includes inductors to complete the filter circuit, although inductors are not high-Q components and do not adversely affect the characteristics of the high-Q filter 321. Referring again to the example in FIG. 5, the filter 321 further includes series inductor 581 and parallel inductor 582, as well as shunt inductors 583, 584, 585 and 586 connected to ground. Of course, various arrangements of high-Q acoustic resonators, inductors and/or other circuit elements may vary, to provide unique benefits for particular situations or to meet application specific design requirements of various implementations of the band pass filter, as would be apparent to one skilled in the art.

In the third filter branch 330, the frequency band for 5 GHz WiFi requires a very high bandwidth, and therefore the filter 332 is unable to include high-Q acoustic resonators arranged in high-Q filter stages. Thus, in the depicted embodiment, the filter 332 includes an illustrative LC circuit. In particular, series capacitors 591, 592 and 593 are connected in series between the common antenna node 306 and a terminal 590. Shunt inductors 594, 595 and shunt capacitors 596, 597 are connected to ground from between the series capacitors 591 and 592 and the series capacitors 592 and 593, respectively. Also, shunt inductor 598 and acoustic shunt resonator 599 are connected to ground from between the series capacitor 593 and the terminal 590. Of course, various arrangements of LC components and/or other circuit elements may vary, to provide unique benefits for particular situations or to meet application specific design requirements of various implementations of the band pass filter, as would be apparent to one skilled in the art.

Figure 6:
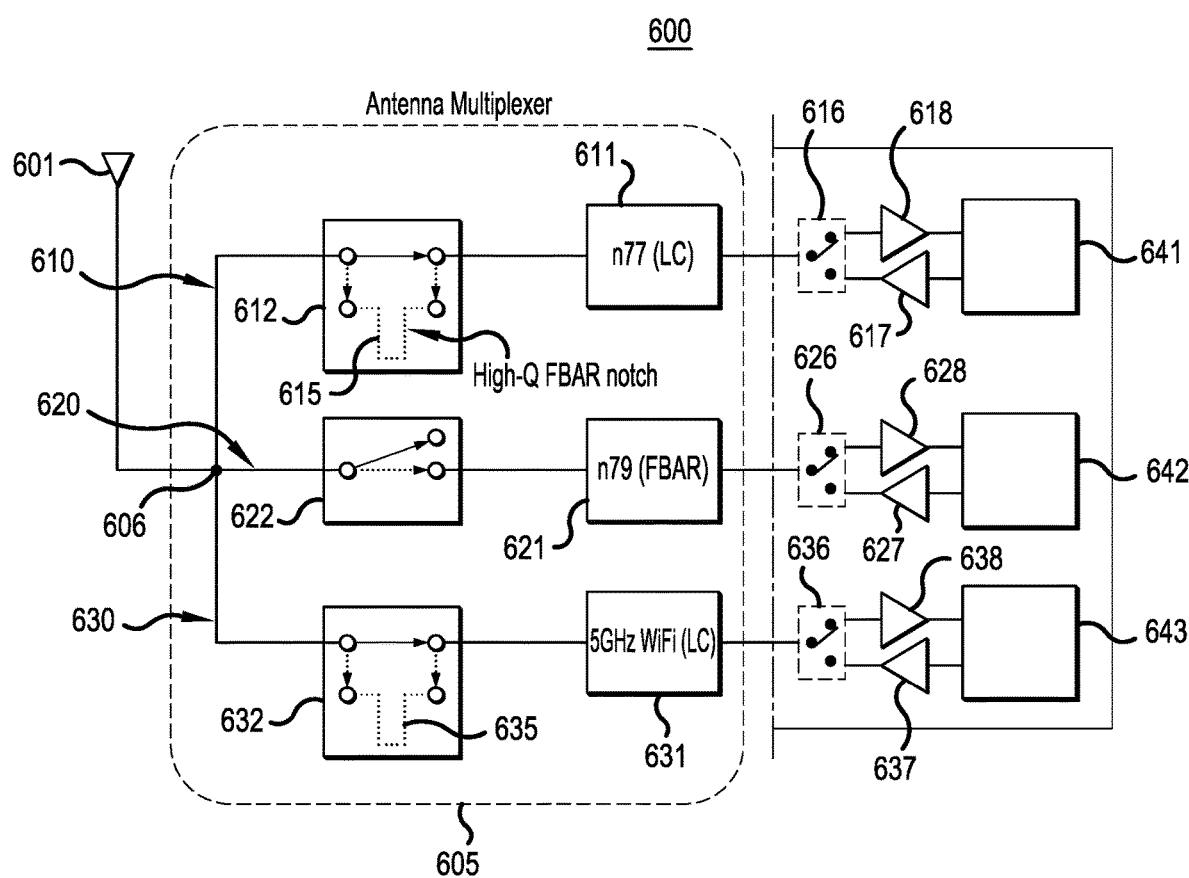
FIG. 6 is a simplified block diagram of a communication device with a multiplexer including multiple filter branches, at least one of which having a selectable high-Q filter forming a notch filter, according to a representative embodiment.

In alternative embodiments, the high-Q components for providing steep roll-off may be implemented as high-Q notch filters that truncate the upper and/or lower edges of passbands of band pass filters that do not otherwise include high-Q components. For example, FIG. 6 is a simplified block diagram of a (mobile) communication device with a multiplexer including multiple filter branches, at least one of which having selectable notch filters respectively including high-Q filter components (as well as band pass filters), according to a representative embodiment. Each notch filter has a stopband corresponding to a portion of the passband of an associated band pass filter, e.g., for rejecting or otherwise creating a stop condition on some frequencies of the associated band pass filter.

Referring to FIG. 6, a (mobile) communication device 600 includes an antenna 601, a multiplexer 605 with multiple filter branches connected to the antenna 601 via a common antenna node 606, and representative first transceiver 641, second transceiver 642 and third transceiver 643 connectable to the multiple filter branches of the multiplexer 605 via switches 616, 626 and 636, respectively. As shown in FIG. 6, the multiple filter branches include illustrative first filter branch 610, second filter branch 620 and third filter branch 630. Each of the first, second and third filter branches 610, 620 and 630 corresponds to at least one predetermined frequency band, and filters (transmitted and/or received) RF signals according to the frequency ranges of the corresponding frequency band(s). In the depicted embodiment, each of the first, second and third filter branches 610, 620 and 630 provides filtering for new frequency bands in the ultra-high band domain, i.e., frequencies above 3 GHz, although one or more of the first, second and third filter branches 610, 620 and 630 may provide filtering at frequencies below 3 GHz, without departing from the scope of the present teachings.

The multiplexer 605 may be configured to receive RF signals from the antenna 601 at the common antenna node 606 and/or to send RF signals from the common antenna node 606 to the antenna 601. More particularly, the first filter branch 610 is connected between the common antenna node 606 and the first transceiver 641 via a first switch 616; the second filter branch 620 is connected between the common antenna node 606 and the second transceiver 642 via a second switch 626; and the third filter branch 630 is connected between the common antenna node 606 and the third transceiver 643 via a third switch 636. The first, second and third switches 616, 626 and 636 may be single pole, double throw switches, for example, since each of the first, second and third filter branches 610, 620 and 630 provides filter options for one frequency band selectively connectable to the receive and transmit sides of the first, second and third transceivers 641, 642 and 643, respectively.

RF signals transmitted by the first transceiver 641 in a transmit mode are amplified by a transmit power amplifier 617 and RF signals received by the first transceiver 641 in a receive mode are amplified by a receive amplifier 618. Likewise, RF signals transmitted by the second transceiver 642 in a transmit mode are amplified by a transmit power amplifier 627 and RF signals received by the second transceiver 642 in a receive mode are amplified by a receive amplifier 628. RF signals transmitted by the third transceiver 643 in a transmit mode are amplified by a transmit power amplifier 637 and RF signals received by the third transceiver 643 in a receive mode are amplified by a receive amplifier 638.

In the depicted embodiment, the first filter branch 610 corresponds to frequency band n77 in the depicted example, which has a bandwidth of 3.3 GHz-4.2 GHz, although other frequency bands may be incorporated without departing from the scope of the present teachings. As discussed above, the frequency band n77 requires a very high bandwidth (e.g., approximately 21 percent), and therefore the filter 611 is unable to directly include a high-Q filter stage including high-Q components (e.g., high-Q acoustic resonators), for example, due to the limited bandwidths serviceable by high-Q components. Rather, the filter 611 includes components not having high-Q filter stages, including low-Q components, such as inductors and capacitors arranged in an LC filter circuit configuration. Accordingly, the first filter branch 610 includes filter 611 for providing band pass filtering for the frequency band n77.

Figure 8:
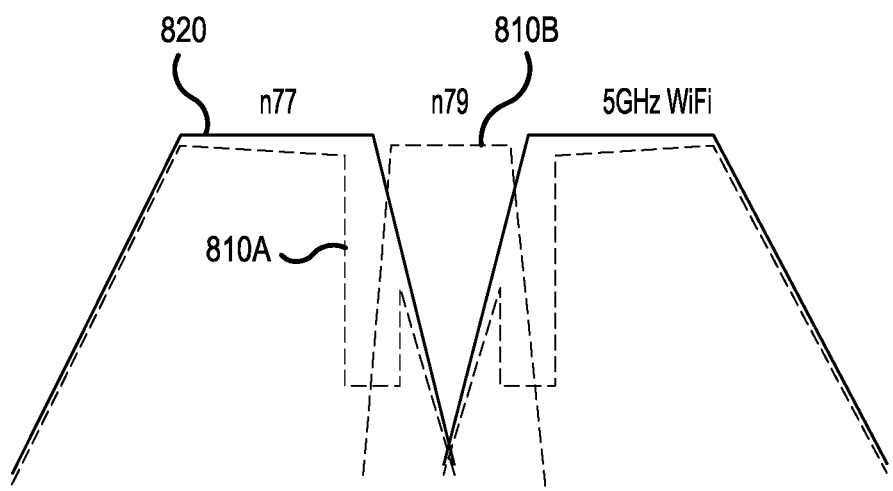
FIG. 8 is a simplified graph showing insertion loss of the filter branches at the common antenna node during operation of the multiplexer in the communication device shown in FIG. 6.

The first filter branch further includes a switch 612 in series with the filter 611, where the switch 612 is configured to switch a notch filter 615 comprising high-Q components in and out of the first filter branch 610. In the depicted embodiment, when the switch 612 is in a first switch state, it switches high-Q components (arranged as a high-Q filter stage) into the first filter branch 610, for improving roll-off of the passband of the band pass filter provided by the filter 611. In a second switch state, the switch 612 switches the high-Q components out of the first filter branch 610, so that the first filter branch 610 includes no high-Q filter stages, removing the steep roll-off, but still supports the very high bandwidth for filtering the RF signals in the frequency band n77. The notch filter 615 has a stopband that corresponds to an upper portion of the passband of the frequency band n77, as shown in FIG. 8, discussed below.

Figure 9:
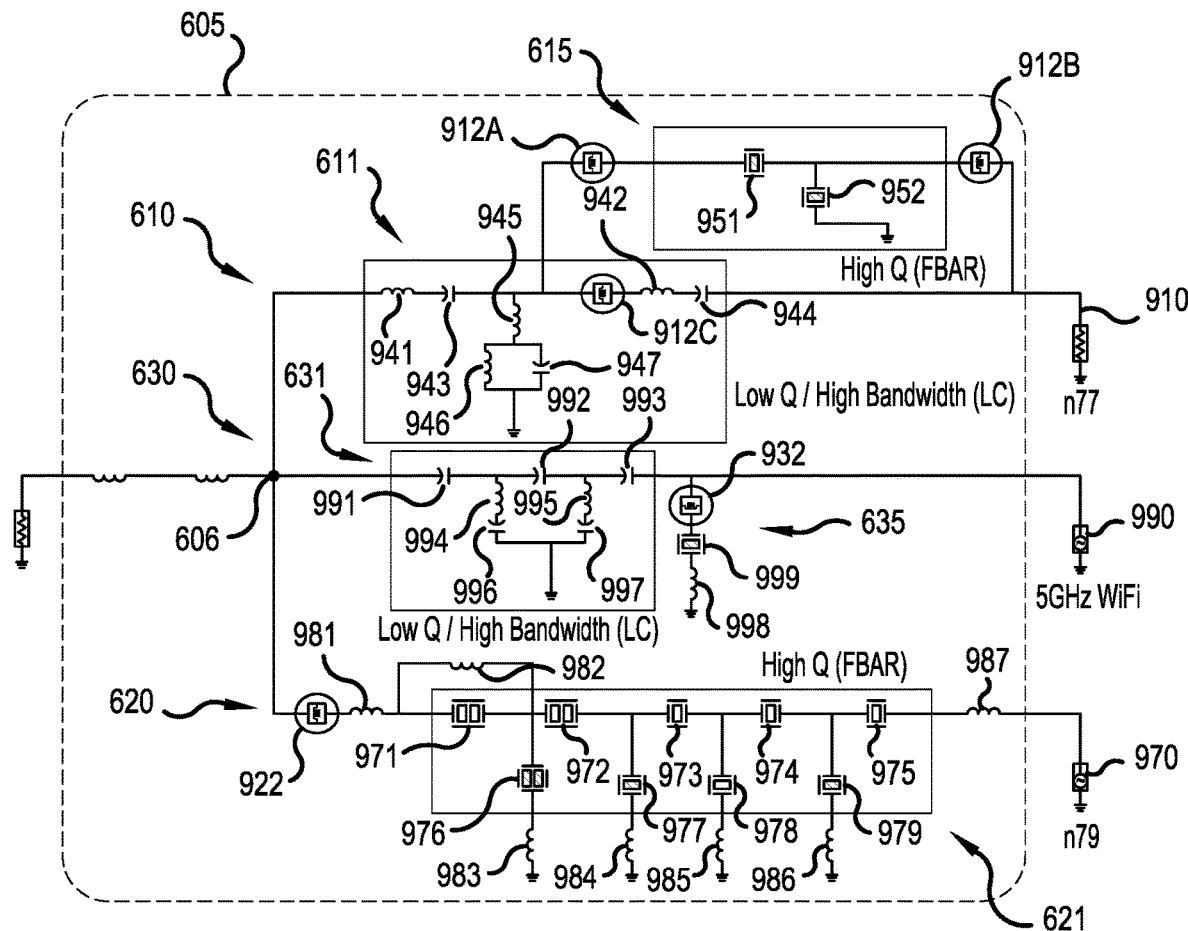
FIG. 9 is a simplified circuit diagram of a multiplexer including multiple filter branches, as shown in FIG. 6, at least one of which having a selectable high-Q filter forming a notch filter, according to a representative embodiment.

Also in the depicted embodiment, the illustrative second filter branch 620 corresponds to frequency band n79, which has a bandwidth of 4.4 GHz-5.0 GHz, although another frequency band may be incorporated without departing from the scope of the present teachings. Accordingly, the second filter branch 620 includes filter 621 to provide band pass filtering for the frequency band n79. The frequency band n79 does not require a very high bandwidth, and therefore may include high-Q components arranged in high-Q filter stages, for example, to provide steep roll-off of the relatively narrow passband. As discussed above, the high-Q components may include BAW resonators, such as FBARs and/or SMRs, and/or SAW resonators. In various embodiments (e.g., as shown in FIG. 9), the BAW resonators may be arranged in a ladder-type filter formation, including series and shunt connected acoustic resonators, e.g., forming high-Q filter stages, respectively. Therefore, the filter 621 is able to provide high-Q filtering characteristics, such as steep roll-off, in the second filter branch 620.

The second filter branch 620 further includes an activation switch 622 in series with the filter 621, where the activation switch 622 is configured to activate and inactivate the second filter branch 620, thereby switching the filter 621 in and out of the second filter branch 620 (and thus in and out of the multiplexer 605). In the depicted embodiment, when the activation switch 622 is in a first switch state, it switches the filter 621, including the high-Q components, into the second filter branch 620, to provide a relatively narrow passband for the frequency band n79 with steep roll-off. In a second switch state, the activation switch 622 switches the filter 621, including the high-Q components, out of the second filter branch 620. The second switch state thus effectively removes the second filter branch 620 from the multiplexer 605 (and the ability of the multiplexer 605 to filter the frequency band n79).

Also in the depicted illustrative embodiment, the third filter branch 630 corresponds to a frequency band for 5 GHz WiFi, which has a bandwidth of about 5.1 GHz-6.0 GHz, although other frequency bands may be incorporated without departing from the scope of the present teachings. As discussed above, the frequency band for 5 GHz-WiFi requires a very high bandwidth (e.g., approximately 15 percent), and therefore the filter 631 is unable to directly include a high-Q filter stage including high-Q components, for example. Rather, the filter 631 includes components not having high-Q filter stages, including low-Q components, such as inductors and capacitors arranged in an LC filter circuit configuration. Accordingly, the third filter branch 630 includes the filter 631 for providing band pass filtering for the frequency band for 5 GHz WiFi.

The third filter branch further includes a switch 632 in series with the filter 631, where the switch 632 is configured to switch a notch filter 635 comprising high-Q components in and out of the third filter branch 630. In the depicted embodiment, when the switch 632 is in a first switch state, it switches at the high-Q components into the third filter branch 630, for improving roll-off of the passband of the band pass filter provided by the filter 631. In a second switch state, the switch 632 switches the high-Q components out of the third filter branch 630, so that the first filter 630 includes no high-Q filter stages, removing the steep roll-off, but still supports the very high bandwidth for filtering the RF signals in the frequency band for 5 GHz WiFi. The notch filter 635 has a stopband that corresponds to a lower portion of the passband of the frequency band for 5 GHz WiFi, as shown in FIG. 8, discussed below.

As discussed above, the switches 612 and 632, and the activation switch 622, are operated in response to control signals provided by a controller (not shown). Stated differently, when band n79 is supposed to be used concurrently with band n77 and 5 GHz WiFi, the switch state is put to "notch mode" (dashed lines in the switches 612 and 632, and in the activation switch 622, in FIG. 6), and when band n79 signal is not needed, switches 612 and 632 are put to "no-notch mode" for optimum performance in band n77 and in the 5 GHz WiFi frequency band.

Figure 7:
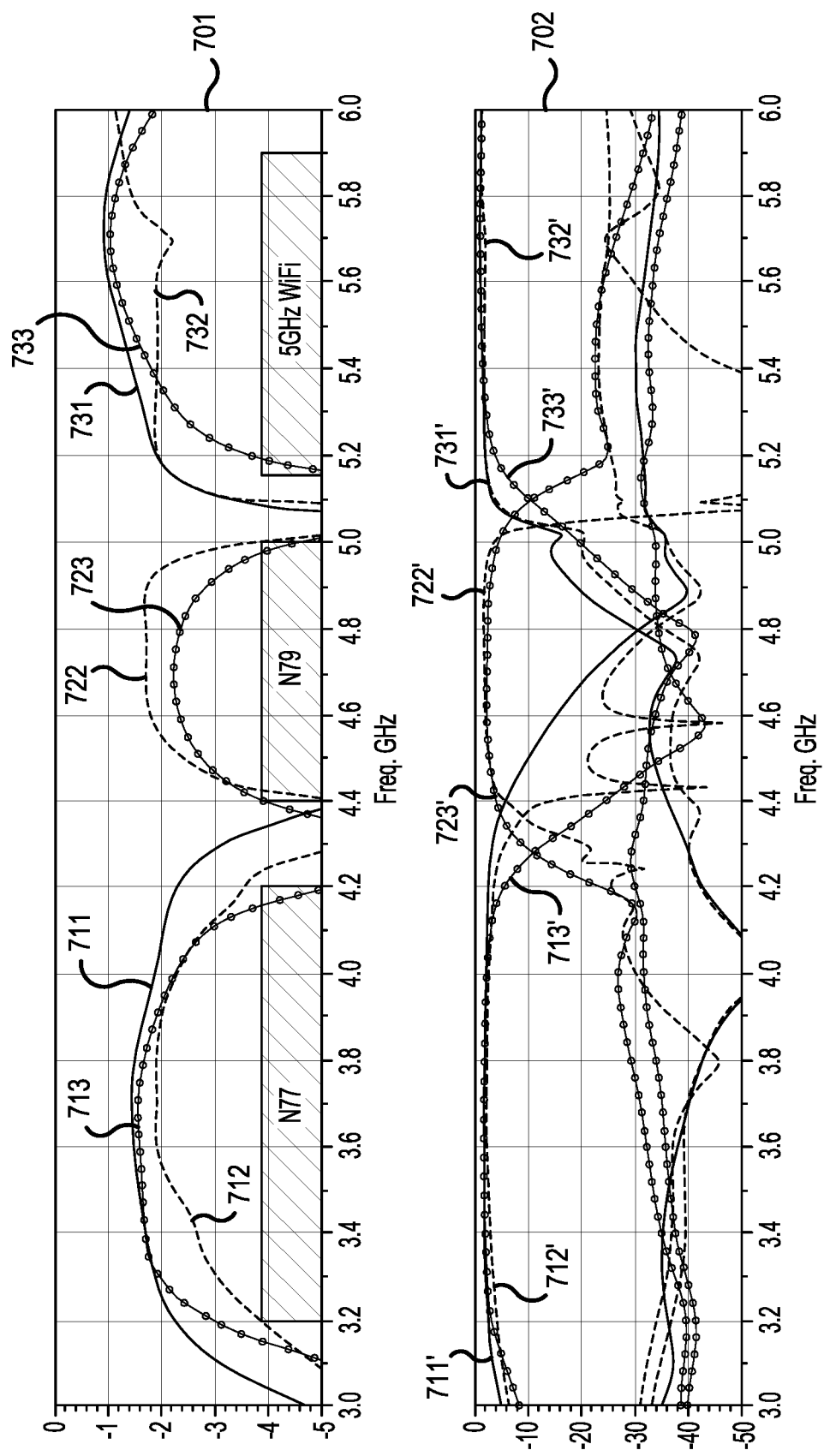
FIG. 7 is a pair of graphs showing insertion loss and signal attenuation, respectively, measured through the filter branches as a function of signal frequency during operation of the multiplexer in the communication device shown in FIG. 6.

FIG. 7 is a pair of graphs showing insertion loss and signal attenuation of the first, second and third filter branches 610, 620 and 630 during operation of the multiplexer 605. Referring to FIG. 7, the top graph 701 shows insertion loss and the bottom graph 702 shows signal attenuation with regard to the filter branches identified in FIG. 6, using wideband LC (non-high-Q) filter components, high-Q filter components, and conventional LC filter components (for purpose of comparison), respectively.

In the top graph 701, with regard to the first filter branch 610, curve 711 shows the insertion loss measured through the first filter branch 610 for frequency band n77 using the filter 611, which is a low-Q filter defined by low-Q components and no high-Q filter stages (and switch 612 in the second state). Curve 712 shows the insertion loss measured through the first filter branch 610 using the filter 611 together with the notch filter 615 comprising high-Q components switched in by the switch 612 (switch 612 in the first state). Thus, the first filter branch 610 includes at least one high-Q filter stage. For comparison purposes, curve 713 shows the insertion loss for frequency band n77 for a multiplexer using conventional LC filter components for n77, n79 and 5 GHz WiFi, which include no high-Q filter stages. That is, curve 713, as well as related curves 723 and 733 (discussed below), show a pure LC solution using LC circuits for all three of bands n77, n79 and 5 GHz WiFi.

As compared to curves 711 and 713, curve 712 (corresponding to use of a high-Q filter stage) has significantly steeper roll-off at the edges of the passband for the frequency band n77. This is due to the effects of the notch filters provided by the high-Q components at the edges of the passband for the frequency band n77. Notably, the bandwidth indicated by curve 712 is smaller than that indicated by curve 711 (the band pass filter for frequency band n77 without the notch filters). However, the passband shown by the curve 712 is still larger than the passband of the conventional filtering indicated by the curve 713, which cuts off a portion of the upper edge of the passband. As compared to curves 712 and 713, curve 711 (corresponding to the filter 611, only, with no high-Q filter stages involved) has significantly higher bandwidth for the frequency band n77, as well as lower insertion loss in some portions, than the conventional implementation shown by curve 713, most notably at the edges of the passband for the frequency band n77. This enables the filter 611 to capture the entire bandwidth of the frequency band n77.

With regard to the second filter branch 620, curve 722 shows the insertion loss measured through the second filter branch 620 for narrow frequency band n79 using the filter 621, which includes high-Q components, such as BAW resonators and/or SAW resonators. For comparison purposes, curve 723 shows the insertion loss in band n79 of a multiplexer using conventional LC filter components, which include no high-Q components arranged in a high-Q filter stage. As compared to curve 723, curve 722 has significantly steeper roll-off at the edges of the passband for the frequency band n79, as well as lower insertion loss (between 1 dB and 2 dB lower as compared to curve 723, particularly in the middle and at the upper side of the passband for the frequency band n79. The bandwidth indicated by curve 722 is relatively small, enabling the use of high-Q filter components arranged in high-Q filter stage(s), as discussed above.

With regard to the third filter branch 630, as compared to curves 731 and 733, curve 732 (e.g., corresponding to use of the high-Q components in the notch filter 635) has steeper roll-off at the edges of the passband for the frequency band for 5 GHz WiFi. This is due to the effects of the notch filters provided by the high-Q filter at the edges of the passband for the frequency band for 5 GHz WiFi. In addition, curve 731 shows the insertion loss measured through the third filter branch 630 for the frequency band for 5 GHz WiFi, which includes no high-Q filter stages. For comparison purposes, curve 733 shows the insertion loss for frequency band for 5 GHz WiFi of a multiplexer using conventional LC filter components, which include no high-Q filter stages. As compared to curve 733, curve 731, as well as curve 732, has a higher bandwidth for the frequency band for 5 GHz WiFi than the conventional implementation shown by curve 733, particularly at the lower edge of the passband where the conventional implementation cuts off a portion of the for 5 GHz WiFi passband. This enables the filter 631 to capture the entire bandwidth of the frequency band for 5 GHz WiFi.

In the bottom graph 702, curve 712' shows the attenuation measured through the first filter branch 610, e.g., when the switch 612 is in the first state, for the frequency band n77 using the high-Q notch filter 615, and curve 711' shows the attenuation measured through the first filter branch 610, e.g., when the switch 612 is in the second state, for the frequency band n77 with no high-Q filter stages. Curve 722' shows the attenuation measured through the second filter branch 620, e.g., when the activation switch 622 is in the first state, for the frequency band n79, incorporating the high-Q filter 621. There is no corresponding curve for the second filter branch 620 for the frequency band n79 when the activation switch 622 is in the second state since the filter 621 is switched out of the multiplexer 605. Curve 732' shows the attenuation measured through the third filter branch 630, e.g., when the switch 632 is in the first state, for the frequency band for 5 GHz WiFi using the high-Q notch filter 635, and curve 731' shows the attenuation measured through the third filter branch 630, e.g., when the switch 632 is in the second state, for the frequency band for 5 GHz WiFi with no high-Q filter stages. For comparison purposes, curves 713', 723' and 733' show the attenuation for frequency bands n77, n79 and 5 GHz WiFi, respectively, for a multiplexer using conventional LC filters for all three filter branches.

FIG. 8 is a simplified graph showing insertion loss of the first, second and third filter branches 610, 620 and 630 during operation of the multiplexer 605.

Referring to FIG. 8, curves 810A and 810B show the insertion loss when each of the switches 612, 622 and 623 is in the first switch state, such that the respective first, second and third filter branches 610, 620 and 630 include high-Q filter stages. More particularly, curve 810A corresponds to the insertion losses of the band pass filters for frequency bands n77 and for 5 GHz WiFi, in combination with the notch filters including high-Q filter stages. The effects of the notch filters are apparent from the vertical portions of the curve 810A at the upper edge of the passband for the frequency band n77 and at the lower edge of the passband for the frequency band for 5 GHz WiFi. Curve 810B shows the insertion loss of the band pass filter for frequency band n79 (which is activated when the activation switch 622 is in the first switch state). Notably, the notches provided by the notch filters provide spacing between the frequency band n79 and each of the frequency bands for n77 and 5 GHz WiFi.

Curve 820 shows the insertion loss when each of the switches 612, 622 and 623 is in the second switch state, such that the respective first, second and third filter branches 610, 620 and 630 do not include high-Q components. More particularly, curve 820 corresponds to the insertion losses of the band pass filters for the frequency bands n77 and for 5 GHz WiFi, without the notch filters including high-Q filter stages. Also, curve 820 shows no passband for the frequency band n79, which is switched out of the second filter branch 620 when the activation switch 622 is in the second state.

FIG. 9 is a simplified circuit diagram of a multiplexer including multiple filter branches, as shown in FIG. 6, at least one of which having selectable high-Q filter components arranged in high-Q filter stages forming notch filters, according to a representative embodiment.

Referring to FIG. 9, the multiplexer 605, shown as a circuit diagram, includes the common antenna node 606, to which the first filter branch 610, the second filter branch 620 and the third filter branch 630 are connected. As discussed above with reference to FIGS. 6 to 8, the first filter branch 610 corresponds to the frequency band n77, and therefore includes filter 611 to provide band pass filtering for the frequency band n77. Also as discussed above, the second filter branch 620 corresponds to the frequency band n79, and therefore includes filter 621 to provide band pass filtering for the frequency band n79, and the third filter branch 630 corresponds to the frequency band for 5 GHz WiFi, and therefore includes filter 631 to provide band pass filtering for the frequency band for 5 GHz WiFi. The first, second and third filter branches 610, 620 and 630 are arranged in a different order in FIG. 9 than in FIG. 6, although this is for the sake of convenience and results in no changes to the operation of the multiplexer 605.

The first filter branch 610 and the third filter branch 630 include selectable notch filters 615 and 635, respectively, which are high-Q filters that include high-Q components, shown in FIG. 9 as high-Q acoustic resonators (e.g., FBARs). Accordingly, the multiplexer 605 includes switch 612 (shown in FIG. 6) in the first filter branch 610, which is implemented by switch components 912A, 912B and 912C in the circuit diagram of FIG. 9. Similarly, the multiplexer 605 includes switch 632 (shown in FIG. 6) in the third filter branch 630, which is implemented by switch component 932 in the circuit diagram of FIG. 9. Also, the second filter branch 620 includes the activation switch 622, which operationally removes the filter 621 corresponding to the frequency band n79 from the circuitry of the multiplexer 605. The activation switch 622 is implemented by switch component 922 in the circuit diagram of FIG. 9.

Referring to the first filter branch 610, the switch component 912B effectively mirrors operation of the switch component 912A, switching the notch filter 615 in and out of the first filter branch 610. That is, when the switch components 912A and 912B are activated (closed), the notch filter 615 is switched into the first filter branch 610 (to include high-Q acoustic resonators of high-Q filter stages), and when the switch components 912A and 912B are inactivated (opened), the notch filter 615 is switched out of the first filter branch 610. The switch component 912C selectively connects the filter 611 to a terminal 910, either directly when the switch component 912C is activated, or indirectly through the notch filter 615, when the switch component 912C is inactivated (and the switch components 912A and 912B are activated). Accordingly, in a first switch state, the switch components 912A and 912B are activated, and the switch component 912C is inactivated, so that the filter 611 and the notch filter 615 are selected for filtering the frequency band n77. In a second switch state, the switch components 912A and 912B are inactivated, and the switch component 912C is activated, so that only the filter 611 is selected for filtering the frequency band n77. The switch components 912A, 912B and 912C may be solid state switches implemented using CMOS- or Silicon-On-Insulator-Technology, for example.

With regard to the first filter branch 610, as discussed above, the frequency band n77 requires a very high bandwidth, and therefore the filter 611 is unable to include high-Q acoustic resonators arranged in a high-Q filter stage. Thus, in the depicted embodiment, the filter 611 includes in an illustrative LC circuit including only inductors and capacitors. In particular, series inductors 941, 942 and series capacitors 943, 944 are connected in series between the common antenna node 606 and the terminal 910. Shunt inductors 945, 946 and shunt capacitor 947 are connected to ground between the series capacitor 943 and the series inductor 942, where the shunt inductor 946 and the shunt capacitor 947 are in parallel with one another. With regard to the notch filter 615, which is switchable into and out of the first filter branch 610, a series high-Q acoustic resonator 951 is connected between the switch components 912A and 912B. A shunt high-Q acoustic resonator 952 is connected to ground from between the series high-Q acoustic resonator 951 and the switch component 912B. The series high-Q acoustic resonator 951 and the shunt high-Q acoustic resonator 952 form a high-Q filter stage. Of course, various arrangements of LC components, high-Q components, and/or other circuit elements may vary, to provide unique benefits for particular situations or to meet application specific design requirements of various implementations of the band pass filter, as would be apparent to one skilled in the art.

In the second filter branch 620, the filter 621 is selected, e.g., by operation of the switch component 922, for filtering the frequency band n79. As discussed above, the frequency band n79 has a relatively narrow bandwidth (e.g., less than 15 percent), and therefore the filter 621 is able to be implemented using high-Q components, such as BAW resonators (e.g., FBARs and/or SMRs), and/or SAW resonators. Accordingly, the filter 621 provides steep roll-off of the relatively narrow passband. In the depicted example, the high-Q resonators of the filter 621 are FBARs arranged in a ladder-type filter configuration.

More particularly, the filter 621 includes series high-Q acoustic resonators 971, 972, 973, 974, 975 connected in series between the switch component 922 and a terminal 970. Further, shunt high-Q acoustic resonators 976, 977, 978, 979 are connected to ground from between series high-Q acoustic resonators 971 and 972, series high-Q acoustic resonators 972 and 973, series high-Q acoustic resonators 973 and 974, and series high-Q resonators 974 and 975, respectively. The filter 621 also includes inductors to complete the filter circuit, although inductors are not high-Q components. Referring again to the example in FIG. 9, the filter 621 includes series inductors 981 and 987, parallel inductor 982, as well as shunt inductors 983, 984, 985 and 986 connected to ground. The parallel inductor 982 is connected in parallel with the series high-Q acoustic resonator 971. In the depicted configuration, the arrangement of series and shunt resonators may be described in terms of high-Q filter stages, e.g., formed by series resonator 971 and shunt resonator 976, series resonator 972 and shunt resonator 977, series resonator 973 and shunt resonator 978, and series resonator 974 and shunt resonator 979, respectively. Of course, various arrangements of high-Q acoustic resonators, inductors and/or other circuit elements may vary, to provide unique benefits for particular situations or to meet application specific design requirements of various implementations of the band pass filter, as would be apparent to one skilled in the art.

In the third filter branch 630, the frequency band for 5 GHz WiFi requires a very high bandwidth, and therefore the filter 631 is unable to include high-Q acoustic resonators arranged in a high-Q filter stage. Thus, in the depicted embodiment, the filter 631 includes an illustrative LC circuit. In particular, series capacitors 991, 992 and 993 are connected in series between the common antenna node 606 and a terminal 990. Shunt inductors 994, 995 and shunt capacitors 996, 997 are connected to ground from between the series capacitors 991 and 992 and the series capacitors 992 and 993, respectively. Also, the selectable notch filter 635 may be included in the third filter branch 630 by operation of the switch component 932. The notch filter 635 includes a shunt high-Q acoustic resonator 999 connected in series with a shunt inductor 998 between the switch component 932 and ground. Of course, various arrangements of LC components, high-Q components and/or other circuit elements may vary, to provide unique benefits for particular situations or to meet application specific design requirements of various implementations of the band pass filter, as would be apparent to one skilled in the art.

The various components, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A multiplexer, comprising:
   a common port;
   a plurality of filter branches connected to the common port, each filter branch corresponding to at least one predetermined frequency band and filtering a radio frequency (RF) signal according to the corresponding at least one predetermined frequency band; and
   at least one switch included in a switched filter branch of the plurality of filter branches, wherein in a first switch state of the at least one switch, the switched filter branch includes a high-Q filter comprising a plurality of high-Q components for improving roll-off of the filtered RF signal, and in a second switch state of the at least one switch, alternative to the first switch state, the switched filter branch includes a low-Q filter comprising a plurality of low-Q components that support a very high bandwidth for filtering the RF signal.

2. The multiplexer of claim 1, wherein each of the high-Q components has a Q-factor of at least 500.

3. The multiplexer of claim 1, wherein the very high bandwidth for filtering the RF signal is greater than 15 percent.

4. The multiplexer of claim 1, wherein each of the low-Q components has a Q-factor less than 100.

5. The multiplexer of claim 1, wherein in the second switch state, the switched filter branch includes no high-Q filter stage in the low-Q filter, wherein a high-Q filter stage includes at least one series high-Q acoustic resonator and at least one shunt high-Q acoustic resonator.

6. The multiplexer of claim 1, wherein each high-Q component comprises a bulk acoustic wave (BAW) resonator or a surface acoustic wave (SAW) resonator.

7. The multiplexer of claim 1, wherein in the first switch state, the high-Q filter in the switched filter branch functions as a band pass filter having a passband for the corresponding at least one predetermined frequency band.

8. The multiplexer of claim 1, wherein in the first switch state, the high-Q filter in the switched filter branch functions as a notch filter having a stopband immediately adjacent to the corresponding at least one predetermined frequency band.

9. The multiplexer of claim 1, wherein in the second switch state, the low-Q filter in the switched filter branch functions as a band pass filter comprising an LC circuit with at least one inductor and at least one capacitor.

10. The multiplexer of claim 1, wherein in the second switch state, the switched filter branch includes only low-Q components in the low-Q filter.

11. The multiplexer of claim 1, wherein in the second switch state, the switched filter branch includes a shunt high-Q component, in addition to the plurality of low-Q components, in the low-Q filter.

12. The multiplexer of claim 1, wherein the at least one predetermined frequency band corresponding to each filter branch of the plurality of filter branches includes frequencies between 3 GHz and 10 GHz.

13. The multiplexer of claim 1, further comprising:
   an activation switch included in a selectively activated filter branch of the plurality of filter branches, wherein in a first activation switch state of the activation switch, the selectively activated filter branch is included in the multiplexer, and in a second activation switch state of the activation switch, the selectively activated filter branch is excluded from the multiplexer, wherein the selectively activated filter branch includes another high-Q filter comprising another plurality of high-Q components.

14. The multiplexer of claim 1, wherein the plurality of high-Q components in the high-Q filter include shunt-connected high-Q acoustic resonators and series-connected high-Q acoustic resonators arranged in a ladder-type acoustic band pass filter configuration.

15. A multiplexer for selectively filtering radio frequency (RF) signals in a frequency range from 3 GHz to 10 GHz, the multiplexer comprising:
   a common antenna port; and
   a plurality of filter branches arranged between the common antenna port and a plurality of transceivers, respectively, each filter branch configured to filter RF signals in accordance with a corresponding at least one predetermined frequency band,
   wherein at least one filter branch of the plurality of filter branches comprises a switch having a first switch state, which causes the at least one filter branch to include at least one high-Q filter, comprising high-Q acoustic resonators, for improving roll-off of the filtered RF signals, and a second switch state, alternative to the first switch state, which causes the at least one filter branch to include a low-Q filter, comprising an LC circuit and no high-Q filter stage, for supporting a very high bandwidth for filtering the RF signals.

16. The multiplexer of claim 15, wherein at least one other filter branch of the plurality of filter branches comprises another switch having a first switch state, which causes the at least one other filter branch to connect between the common antenna port and the respective transceiver, and a second switch state, which causes the at least one other filter branch to disconnect from the common antenna port or the respective transceiver.

17. The multiplexer of claim 15, wherein each of the high-Q acoustic resonators has a Q-factor of at least 500.

18. The multiplexer of claim 15, wherein each of the high-Q acoustic resonators has a Q-factor of at least 1000.

19. The multiplexer of claim 15, wherein a bandwidth supported by the at least one filter branch including the at least one high-Q filter is included in the very high bandwidth supported by the at least one filter branch including the low-Q filter.

20. A multiplexer, comprising:
   a common port; and
   a plurality of filter branches connected to the common port, each filter branch corresponding to at least one predetermined frequency band and filtering a radio frequency (RF) signal according to the corresponding at least one predetermined frequency band, wherein the plurality of filter branches comprise a switched filter branch comprising:
- a switch configured to switch between a first switch state and a second switch state;
- a high-Q filter, selectable by the switch in the first switch state, comprising a plurality of high-Q components that provide steep roll-off of the filtered RF signal; and
- a low-Q filter, selectable by the switch in the second switch state, comprising a plurality of low-Q components that provide a very high bandwidth for filtering the RF signal, wherein a bandwidth of the high-Q filter is included in the very high bandwidth of the low-Q filter.

* * * * *